(12) United States Patent
Mano et al.

(10) Patent No.: US 12,308,183 B2
(45) Date of Patent: May 20, 2025

(54) SOLID ELECTROLYTIC CAPACITOR (71) Applicant: Murata Manufacturing Co., Ltd., Nagaokakyo (JP)

(72) Inventors: Kyotaro Mano, Nagaokakyo (JP); Yasutake Fukuda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 155 days.

(21) Appl. No.: 18/065,947

(22) Filed: Dec. 14, 2022

(65) Prior Publication Data

US 2023/0117353 A1 Apr. 20, 2023

Related U.S. Application Data (63) Continuation of application No. PCT/JP2021/022848, filed on Jun. 16, 2021.

(30) Foreign Application Priority Data

Jun. 25, 2020 (JP) .................. 2020-109712

(51) Int. Cl.
*H01G 9/15* (2006.01)
*H01G 9/025* (2006.01)
(Continued)

(52) U.S. Cl.
CPC .............. *H01G 9/15* (2013.01); *H01G 9/025* (2013.01); *H01G 9/0425* (2013.01); *H01G 9/10* (2013.01)

(58) Field of Classification Search
CPC ............ H01G 9/10; H01G 9/025; H01G 9/15; H01G 9/0425
(Continued)

(56) References Cited

U.S. PATENT DOCUMENTS 9,318,268 B2 * 4/2016 Onoue .................... H01G 9/028
2002/0015279 A1 * 2/2002 Sakai ....................... H01G 9/15
361/523
(Continued)

FOREIGN PATENT DOCUMENTS

CN 1308980 C 4/2007
JP H04276613 A 10/1992
(Continued)

OTHER PUBLICATIONS

International Search Report in PCT/JP2021/022848, mailed Aug. 24, 2021, 3 pages.

*Primary Examiner* — Arun Ramaswamy
(74) *Attorney, Agent, or Firm* — ArentFox Schiff LLP (57) ABSTRACT

A solid electrolytic capacitor that includes: a valve-action metal substrate including a porous portion at a surface thereof; a dielectric layer on the porous portion; a solid electrolyte layer on the dielectric layer; a conductive layer on the solid electrolyte layer; and a cathode lead-out layer on the conductive layer. When viewed in a thickness direction, the solid electrolyte layer includes a central region at a center of the solid electrolyte layer and a peripheral region surrounding the central region and defining outer edges of the solid electrolyte layer. The peripheral region is higher than the central region in the thickness direction as measured from a reference surface including a highest point of the porous portion in the thickness direction and perpendicular to the thickness direction. The conductive layer is at least on the central region of the solid electrolyte layer.

19 Claims, 3 Drawing Sheets (51) Int. Cl.
*H01G 9/042* (2006.01)
*H01G 9/10* (2006.01)

(58) Field of Classification Search
USPC .......................................... 361/523, 525, 526
See application file for complete search history.

(56) References Cited

U.S. PATENT DOCUMENTS

| | | |
|---|---|---|
| 2006/0152883 A1 | 7/2006 | Konuma et al. |
| 2019/0122827 A1 | 4/2019 | Furukawa et al. |
| 2019/0237266 A1* | 8/2019 | Tsutsumi ................. H01G 9/10 |

FOREIGN PATENT DOCUMENTS

| | | |
|---|---|---|
| JP | H05101989 A | 4/1993 |
| JP | 2004186684 A | 7/2004 |
| JP | 2010192831 A | 9/2010 |
| JP | 2019079866 A | 5/2019 |

* cited by examiner

SOLID ELECTROLYTIC CAPACITOR

CROSS REFERENCE TO RELATED APPLICATIONS

The present application is a continuation of International application No. PCT/JP2021/022848, filed Jun. 16, 2021, which claims priority to Japanese Patent Application No. 2020-109712, filed Jun. 25, 2020, the entire contents of each of which are incorporated herein by reference.

FIELD OF THE INVENTION

The present invention relates to a solid electrolytic capacitor.

BACKGROUND OF THE INVENTION

A solid electrolytic capacitor is produced by, for example, forming a dielectric layer on a surface of an anode made of a valve-action metal and subsequently forming a cathode opposite to the anode via the dielectric layer. In forming the cathode, for example, a solid electrolyte layer is first formed on a surface of the dielectric layer, and a conductive layer (also referred to as a conductor layer) is then formed on a surface of the solid electrolyte layer.

For example, Patent Literature 1 discloses a method of producing a solid electrolytic capacitor, the method including preparing a first sheet; preparing a second sheet; covering the first sheet with an insulating material; forming a conductor layer on the first sheet; producing a multilayer sheet; producing a multilayer block; cutting the multilayer block to produce multiple element stacks; and forming a first external electrode and a second external electrode.

Patent Literature 1: JP 2019-79866 A

SUMMARY OF THE INVENTION

The method of producing a solid electrolytic capacitor disclosed in Patent Literature 1 includes: applying a conductive paste to a solid electrolyte layer of a first sheet including a valve-action metal substrate with a dielectric layer on its surface and the solid electrolyte layer on the dielectric layer to form a conductor layer; and stacking a second sheet made of metal foil on the first sheet. If the second sheet is stacked with a large amount of the conductive paste applied to form a conductor layer or if the second sheet is stacked at a high pressing pressure, the conductor layer may spread out on the first sheet and stick out. Thus, a sealing defect may occur in the resulting solid electrolytic capacitor, possibly resulting in poor long-term reliability due to deterioration or the like caused by moisture intrusion from outside and poor quality due to dissolution or the like of internal materials caused by penetration of a plating solution during formation of external electrodes. If, in order to prevent the conductor layer from sticking out, the second sheet is stacked with a small amount of the conductive paste applied to form a conductor layer or if the second sheet is stacked with a low pressing pressure, the conductor layer may not be spread out on the first sheet, reducing the contact area between the solid electrolyte layer and the conductor layer. Thus, the resulting solid electrolytic capacitor may have a high resistance.

The present invention attempts to solve the above issue and aims to provide a solid electrolytic capacitor whose resistance can be reduced while the conductive layer is prevented from sticking out.

An solid electrolytic capacitor of the present invention includes: a valve-action metal substrate including a porous portion at a surface thereof; a dielectric layer on the porous portion; a solid electrolyte layer on the dielectric layer; a conductive layer on the solid electrolyte layer; and a cathode lead-out layer on the conductive layer, wherein when viewed in a thickness direction corresponding to a stacking direction of the valve-action metal substrate, the dielectric layer, the solid electrolyte layer, the conductive layer, and the cathode lead-out layer, the solid electrolyte layer includes a central region at a center of the solid electrolyte layer and a peripheral region surrounding the central region and defining outer edges of the solid electrolyte layer, the peripheral region is higher than the central region in the thickness direction as measured from a reference surface including a highest point of the porous portion in the thickness direction and perpendicular to the thickness direction, and the conductive layer is at least on the central region of the solid electrolyte layer.

The present invention can provide a solid electrolytic capacitor whose resistance can be reduced while the conductive layer is prevented from sticking out.

DETAILED DESCRIPTION OF THE PREFERRED EMBODIMENTS

The solid electrolytic capacitor of the present invention is described below. The present invention is not limited to the following preferred embodiments and may be suitably modified without departing from the gist of the present invention. Combinations of preferred features described in the following preferred embodiments are also within the scope of the present invention.

The following embodiments are examples, and features of different embodiments can be partially exchanged or combined with each other. In the second embodiment and subsequent embodiments, a description of features common to the first embodiment is omitted, and only different points are described. In particular, similar effects by similar features are not mentioned in each embodiment. In the following description, the solid electrolytic capacitor of each embodiment is simply referred to as "the solid electrolytic capacitor of the present invention" when no distinction is made between the embodiments.

Embodiment 1

Figure 1:
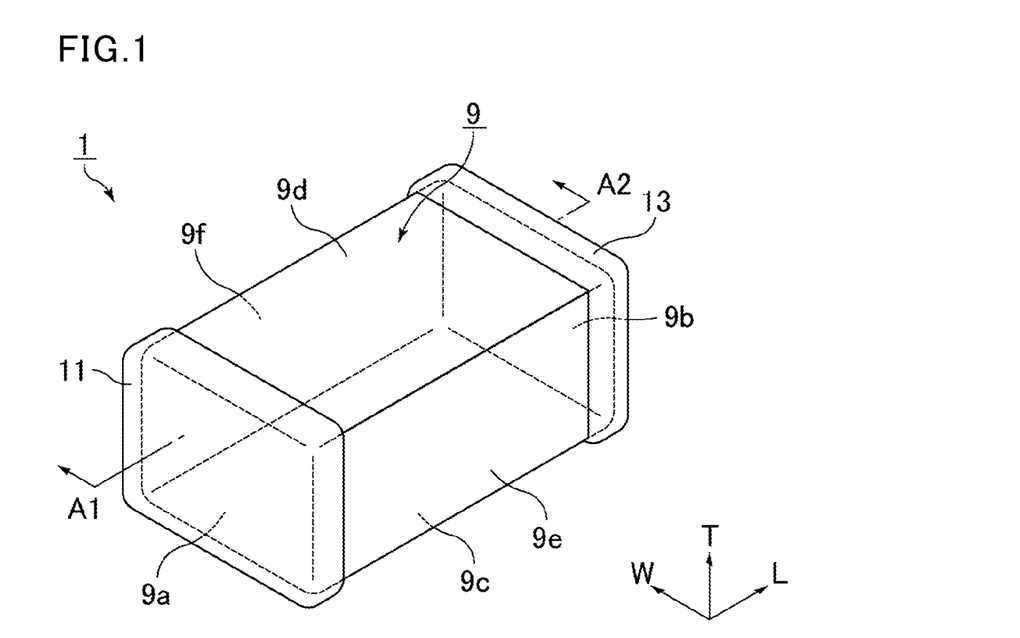
FIG. 1 is a schematic perspective view showing a solid electrolytic capacitor according to Embodiment 1 of the present invention.

FIG. 1 is a schematic perspective view showing a solid electrolytic capacitor according to Embodiment 1 of the present invention.

As shown in FIG. 1, a solid electrolytic capacitor 1 includes a resin molding 9, a first external electrode 11, and a second external electrode 13.

Herein, a length direction, a thickness direction, and a width direction are directions indicated by L, T, and W, respectively, as shown in FIG. 1 and elsewhere. Here, the length direction L, the thickness direction T, and the width direction W are perpendicular to one another.

The resin molding 9 is substantially cuboidal and includes a first end surface 9a and a second end surface 9b opposite to each other in the length direction L; a first main surface 9c and a second main surface 9d opposite to each other in the thickness direction T; and a first side surface 9e and a second side surface 9f opposite to each other in the width direction W.

The first end surface 9a and the second end surface 9b of the resin molding 9 may not be exactly perpendicular to the length direction L. The first main surface 9c and the second main surface 9d of the resin molding 9 may not be exactly perpendicular to the thickness direction T. The first side surface 9e and the second side surface 9f of the resin molding 9 may not be exactly perpendicular to the width direction W.

The first external electrode 11 is on the first end surface 9a of the resin molding 9. The first external electrode 11 may extend from the first end surface 9a of the resin molding 9 to a portion of at least one surface selected from the group consisting of the first main surface 9c, the second main surface 9d, the first side surface 9e, and the second side surface 9f.

The second external electrode 13 is on the second end surface 9b of the resin molding 9. The second external electrode 13 may extend from the second end surface 9b of the resin molding 9 to a portion of at least one surface selected from the group consisting of the first main surface 9c, the second main surface 9d, the first side surface 9e, and the second side surface 9f.

Figure 2:
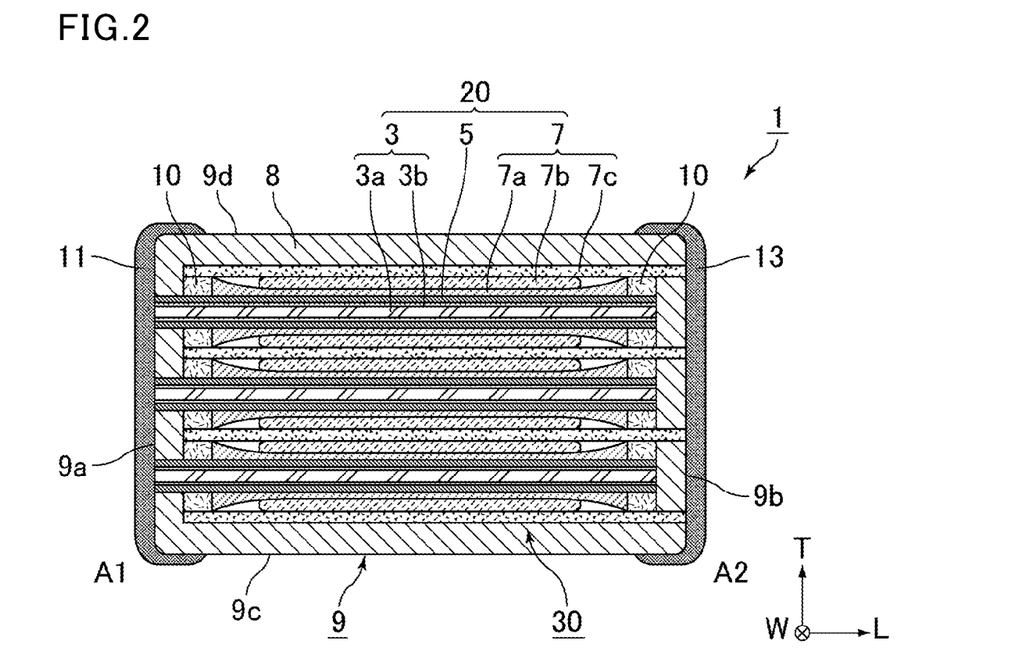
FIG. 2 is a schematic cross-sectional view taken along line A1-A2 in FIG. 1.

FIG. 2 is a schematic cross-sectional view taken along line A1-A2 in FIG. 1.

As shown in FIG. 2, the resin molding 9 includes multiple capacitor elements 20 and a sealing resin 8 sealing the multiple capacitor elements 20. More specifically, the resin molding 9 includes a stack 30 of the multiple capacitor elements 20 stacked in the thickness direction T and the sealing resin 8 sealing the stack 30.

In the stack 30, the capacitor elements 20 may be bonded to each other via a conductive adhesive layer.

Preferably, the resin molding 9 includes multiple capacitor elements 20 but may include one capacitor element 20.

The resin molding 9 may include a support board such as a glass epoxy board at a bottom thereof. When a support board is included in the resin molding 9, a bottom surface of the support board defines the first main surface 9c of the resin molding 9.

Each capacitor element 20 includes an anode 3, a dielectric layer 5, and a cathode 7. The anode 3 and the cathode 7 are opposite to each other via dielectric layer 5. The anode 3 is exposed at the first end surface 9a of the resin molding 9. The cathode 7 (here, a cathode lead-out layer 7c described later) is exposed at the second end surface 9b of the resin molding 9.

The anode 3 includes a valve-action metal substrate 3a at its center.

Examples of valve-action metals of the valve-action metal substrate 3a include elemental metals such as aluminum, tantalum, niobium, titanium, zirconium, magnesium, and silicon, and alloys containing at least one of these elemental metals. In particular, aluminum and an aluminum alloy are preferred.

The valve-action metal substrate 3a is preferably a flat plate, more preferably foil.

The valve-action metal substrate 3a includes a porous portion 3b at a surface thereof.

Preferably, the porous portion 3b is an etched layer of the valve-action metal substrate 3a etched with hydrochloric acid or the like.

The thickness of the valve-action metal substrate 3a before etching is preferably 60 μm to 180 μm. After etching, the thickness of the non-etched core of the valve-action metal substrate 3a is preferably 10 μm to 70 μm. The thickness of the porous portion 3b is designed according to the withstand voltage and capacitance required for the solid electrolytic capacitor 1. In the cross section shown in FIG. 2, the total thickness of the porous portions 3b on both sides of the valve-action metal substrate 3a is preferably 10 μm to 120 μm. The porous portion 3b may be on one of main surfaces of the valve-action metal substrate 3a.

The dielectric layer 5 is on a surface of the porous portion 3b.

Preferably, the dielectric layer 5 is made of an oxide film of the valve-action metal. For example, when the valve-action metal substrate 3a is aluminum foil, the valve-action metal substrate 3a is anodized in an aqueous solution containing boric acid, phosphoric acid, adipic acid, a sodium salt or an ammonium salt thereof, or the like, whereby an oxide film that turns into the dielectric layer 5 is formed. The dielectric layer 5 is formed along the surface of the porous portion 3b, whereby pores (recesses) are formed in the dielectric layer 5.

The thickness of the dielectric layer 5 is designed according to the withstand voltage, capacitance, and the like required for the solid electrolytic capacitor 1. The thickness is preferably 10 nm to 100 nm.

The cathode 7 includes a solid electrolyte layer 7a, a conductive layer 7b, and the cathode lead-out layer 7c.

The solid electrolyte layer 7a is on a surface of the dielectric layer 5.

Examples of constituent materials of the solid electrolyte layer 7a include a conductive polymer having a pyrrole, thiophene, or aniline skeleton. A conductive polymer having a thiophene skeleton is, for example, poly(3,4-ethylenedioxythiophene) (PEDOT). The conductive polymer may be PEDOT:PSS which is a complex with poly(styrene sulfonate) (PSS) as a dopant.

The solid electrolyte layer 7a is formed by, for example, a method in which a polymerized film of poly(3,4-ethylenedioxythiophene) or the like is formed on the surface of the dielectric layer 5 using a treatment liquid containing a monomer such as 3,4-ethylenedioxythiophene, or a method in which a dispersion of a polymer such as poly(3,4-ethylenedioxythiophene) is applied to the surface of the dielectric layer 5 and then dried. The solid electrolyte layer 7a is formed in a predetermined region by applying the above-described treatment liquid or dispersion to the surface of the dielectric layer 5 by a method such as screen printing, sponge transfer printing, inkjet printing, immersion coating, coating using a dispenser, or spray coating, preferably screen printing. Preferably, the solid electrolyte layer 7a is obtained by first forming a solid electrolyte layer for an inner layer for filling the pores (recesses) of the dielectric layer 5 and then forming a solid electrolyte layer for an outer layer for covering the entire dielectric layer 5.

An embodiment of the solid electrolyte layer 7a is described later.

The conductive layer 7b is on a surface of the solid electrolyte layer 7a.

The conductive layer 7b is formed by applying a conductive paste such as a carbon paste, a graphene paste, or a silver paste to a surface of the solid electrolyte layer 7a by a method such as screen printing, sponge transfer printing, inkjet printing, immersion coating, coating using a dispenser, or spray coating.

Preferably, the conductive layer 7b is a carbon layer, a graphene layer, or a silver layer formed by any of the methods described above. The conductive layer 7b may be a composite layer in which a silver layer is disposed on a carbon layer or a graphene layer, or a mixed layer containing a mixture of a carbon paste or a graphene paste with a silver paste.

The thickness of the conductive layer 7b is preferably 2 μm to 20 μm.

The cathode lead-out layer 7c is on a surface of the conductive layer 7b.

The cathode lead-out layer 7c is made of metal foil, a resin electrode layer, or the like, for example.

When the cathode lead-out layer 7c is metal foil, preferably, the metal foil is made of at least one metal selected from the group consisting of aluminum, copper, silver, and an alloy mainly containing at least one of these metals. When the metal foil is made of any of the above metals, the metal foil has a lower resistance. Thus, the resulting solid electrolytic capacitor 1 is likely to have a low equivalent series resistance (ESR).

The metal foil may be one having a surface coated with carbon, titanium, or the like formed by a film forming method such as sputtering or vapor deposition. Of these, carbon-coated aluminum foil is preferably used.

The thickness of the metal foil is preferably 20 μm to 50 μm in view of better handling in the production process, smaller size, and lower ESR.

When the cathode lead-out layer 7c is a resin electrode layer, the resin electrode layer is formed by, for example, applying a conductive paste containing a conductive component and a resin component to the surface of the conductive layer 7b by a method such as screen printing, sponge transfer printing, inkjet printing, immersion coating, coating using a dispenser, or spray coating.

Preferably, the conductive paste for use in forming the cathode lead-out layer 7c contains silver, copper, or nickel as a main component of the conductive component.

When the cathode lead-out layer 7c is formed by printing as described above, the cathode lead-out layer 7c can be made thinner than the metal foil. For example, when the cathode lead-out layer 7c is formed by screen printing, the thickness can be 20 μm or less.

Preferably, the cathode lead-out layer 7c is formed on the surface of the conductive layer 7b while the conductive layer 7b is viscous before drying.

Preferably, the cathode lead-out layer 7c is bonded to the dielectric layer 5 via an insulating adhesive layer 10. This facilitates positioning of the cathode lead-out layer 7c.

When viewed in the thickness direction T, preferably, the insulating adhesive layer 10 surrounds the solid electrolyte layer 7a.

The insulating adhesive layer 10 is formed in a predetermined region by, for example, applying an insulating material such as an insulating resin to the surface of the dielectric layer 5.

As described above, each capacitor element 20 defining the solid electrolytic capacitor 1 includes, in the thickness direction T, the valve-action metal substrate 3a including the porous portion 3b at the surface thereof, the dielectric layer 5, the solid electrolyte layer 7a, the conductive layer 7b, and the cathode lead-out layer 7c.

The sealing resin 8 contains at least a resin, and preferably contains a resin and filler.

Preferred examples of the resin in the sealing resin 8 include an epoxy resin, a phenolic resin, a polyimide resin, a silicone resin, a polyamide resin, and a liquid crystal polymer.

Preferred examples of the filler in the sealing resin 8 include silica particles and alumina particles.

Preferably, the sealing resin 8 includes a material containing a solid epoxy resin, a phenolic resin, and silica particles.

In use of the solid sealing resin 8, the resin molding 9 is preferably formed by a method that uses a resin mold such as a compression mold or a transfer mold. Use of a compression mold is more preferred. In use of the liquid sealing resin 8, the resin molding 9 is preferably formed by a method such as coating using a dispenser or printing. In particular, the resin molding 9 is preferably formed by sealing the stack 30 by the sealing resin 8 using a compression mold.

The resin molding 9 may have rounded corners. The corners of the resin molding 9 may be rounded by barrel polishing, for example.

The first external electrode 11 is connected to the anode 3 exposed at the first end surface 9a of the resin molding 9.

The second external electrode 13 is connected to the cathode 7 (here, the cathode lead-out layer 7c) exposed at the second end surface 9b of the resin molding 9.

Preferably, the first external electrode 11 and the second external electrode 13 are each formed by at least one method selected from the group consisting of screen printing, sponge transfer printing, inkjet printing, immersion coating, coating using a dispenser, spray coating, brush coating, drop casting, electrostatic coating, plating, and sputtering.

Preferably, the first external electrode 11 includes a resin electrode layer containing a conductive component and a resin component. The resin electrode layer in the first external electrode 11 improves the adhesion between the first external electrode 11 and the sealing resin 8, leading to improved reliability.

Preferably, the second external electrode 13 includes a resin electrode layer containing a conductive component and a resin component. The resin electrode layer in the second external electrode 13 improves the adhesion between the second external electrode 13 and the sealing resin 8, leading to improved reliability.

Preferably, the conductive component of the resin electrode layers mainly contains an elemental metal such as silver, copper, nickel, or tin or an alloy containing at least one of these elemental metals, for example.

Preferably, the resin component of the resin electrode layers mainly contains an epoxy resin, a phenolic resin, or the like.

The resin electrode layers are formed, for example, by a method such as screen printing, sponge transfer printing, inkjet printing, immersion coating, coating using a dispenser, spray coating, brush coating, drop casting, or electrostatic coating.

One or both of the first external electrode 11 and the second external electrode 13 may include a plating layer. Examples of the plating layer include a zinc-silver-nickel plating layer, a silver-nickel plating layer, a nickel plating layer, zinc-nickel-gold plating layer, a nickel-gold plating layer, a zinc-nickel-copper plating layer, and a nickel-copper plating layer. Preferably, such a plating layer is further sequentially overlaid by, for example, a copper plating layer, a nickel plating layer, and a tin plating layer (alternatively, one or some of these plating layers may be excluded).

One or both of the first external electrode 11 and the second external electrode 13 may include a resin electrode layer and a plating layer. For example, the first external electrode 11 may include a resin electrode layer connected to the anode 3 and an outer plating layer on a surface of the resin electrode layer on the side opposite to the anode 3. The first external electrode 11 may include an inner plating layer connected to the anode 3, a resin electrode layer covering the inner plating layer, and an outer plating layer on the surface of the resin electrode layer on the side opposite to the anode 3.

The following describes an embodiment of the solid electrolyte layer 7a.

Figure 3:
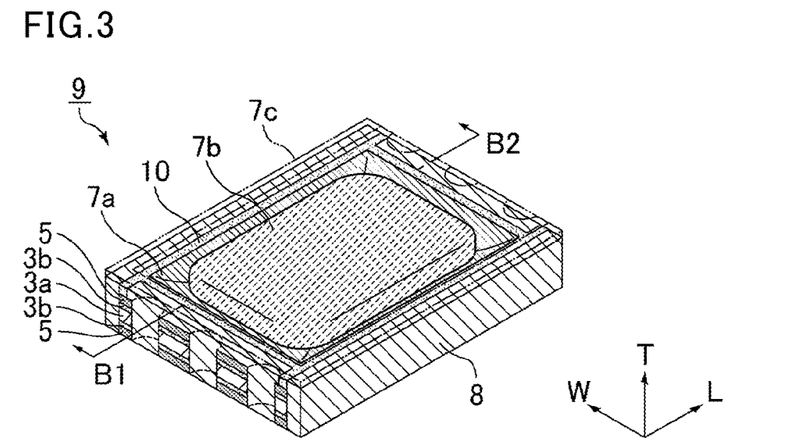
FIG. 3 is a schematic exploded perspective view of a portion of the resin molding shown in FIG. 1.

FIG. 3 is a schematic exploded perspective view of a portion of the resin molding shown in FIG. 1. FIG. 3 shows a state with a cathode lead-out layer being transparent in order to bring focus on how a solid electrolyte layer and a conductive layer are arranged.

As shown in FIG. 3, in the resin molding 9, the solid electrolyte layer 7a is in the form of a basin with the conductive layer 7b inside thereof and is covered by the cathode lead-out layer 7c. More details are as follows.

Figure 4:
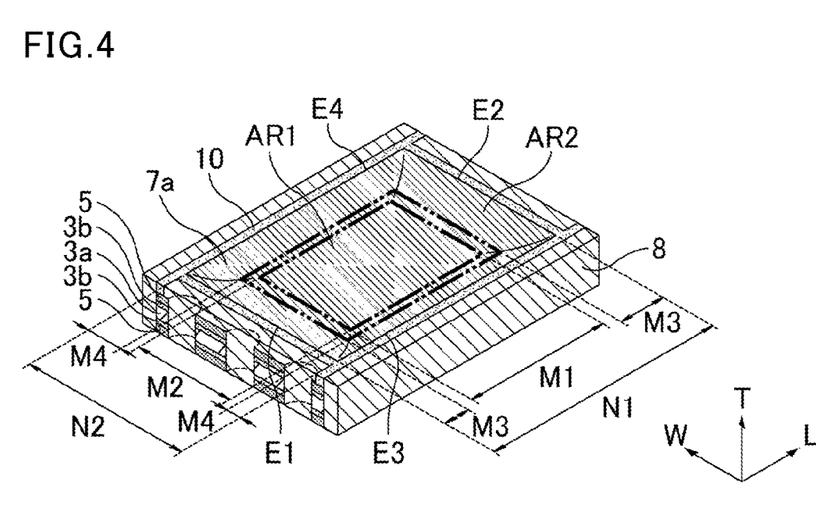
FIG. 4 is a schematic perspective view with a conductive layer and a cathode lead-out layer removed from FIG. 3.

FIG. 4 is a schematic perspective view with a conductive layer and a cathode lead-out layer removed from FIG. 3.

As shown in FIG. 4, when viewed in the thickness direction T, the solid electrolyte layer 7a includes a central region AR1 including a center of the solid electrolyte layer 7a and a peripheral region AR2 surrounding the central region AR1 and including all outer edges of the solid electrolyte layer 7a. When viewed in the thickness direction T, the outer edges of the solid electrolyte layer 7a include a first outer edge E1 and a second outer edge E2 opposite to each other in the length direction L and a third outer edge E3 and a fourth outer edge E4 opposite to each other in the width direction W. The center of the solid electrolyte layer 7a means the center of gravity of the area when the solid electrolyte layer 7a is projected in the thickness direction T.

The central region AR1 is defined by the following range.

When viewed in a cross section in the length direction L and the thickness direction T, the central region AR1 extends in the length direction L from a midpoint between the first outer edge E1 and the second outer edge E2 toward the first outer edge E1 and covers 30% of the distance in the length direction L between the first outer edge E1 and the second outer edge E2, and also extends in the length direction L from the midpoint toward the second outer edge E2 and covers 30% of the distance in the length direction L between the first outer edge E1 and the second outer edge E2. In other words, in the solid electrolyte layer 7a shown in FIG. 4, a length M1 in the length direction L of the central region AR1 is 60% of a distance N1 in the length direction L between the first outer edge E1 and the second outer edge E2.

When viewed in a cross section in the width direction W and the thickness direction T, the central region AR1 extends in the width direction W from a midpoint between the third outer edge E3 and the fourth outer edge E4 toward the third outer edge E3 and covers 30% of the distance in the width direction W between the third outer edge E3 and the fourth outer edge E4, and also extends in the width direction W from the midpoint toward the fourth outer edge E4 and covers 30% of the distance in the width direction W between the third outer edge E3 and the fourth outer edge E4. In other words, in the solid electrolyte layer 7a shown in FIG. 4, a length M2 in the width direction W of the central region AR1 is 60% of a distance N2 in the width direction W between the third outer edge E3 and the fourth outer edge E4.

The peripheral region AR2 is defined by the following range.

When viewed in a cross section in the length direction L and the thickness direction T, the peripheral region AR2 extends in the length direction L from the first outer edge E1 toward a midpoint between the first outer edge E1 and the second outer edge E2 and covers 15% of the distance in the length direction L between the first outer edge E1 and the second outer edge E2, and also extends in the length direction L from the second outer edge E2 toward the midpoint and covers 15% of the distance in the length direction L between the first outer edge E1 and the second outer edge E2. In other words, in the solid electrolyte layer 7a shown in FIG. 4, each length M3 in the length direction L of the peripheral region AR2 is 15% of the distance N1 in the length direction L between the first outer edge E1 and the second outer edge E2.

When viewed in a cross section in the width direction W and the thickness direction T, the peripheral region AR2 extends in the width direction W from the third outer edge E3 toward a midpoint between the third outer edge E3 and the fourth outer edge E4 and covers 15% of the distance in the width direction W between the third outer edge E3 and the fourth outer edge E4, and also extends from the fourth outer edge E4 toward the midpoint and covers 15% of the distance in the width direction W between the third outer edge E3 and the fourth outer edge E4. In other words, in the solid electrolyte layer 7a shown in FIG. 4, each length M4 in the width direction W of the peripheral region AR2 is 15% of the distance N2 in the width direction W between the third outer edge E3 and the fourth outer edge E4.

The peripheral region AR2 is higher than the central region AR1, along a periphery of the central region AR1, when a height in the thickness direction T is defined from a reference surface including a highest point of the porous portion 3b in the thickness direction T and perpendicular to the thickness direction T. An embodiment of the solid electrolyte layer 7a is described below with an example when viewed in a cross section in the length direction L and the thickness direction T.

Figure 5:
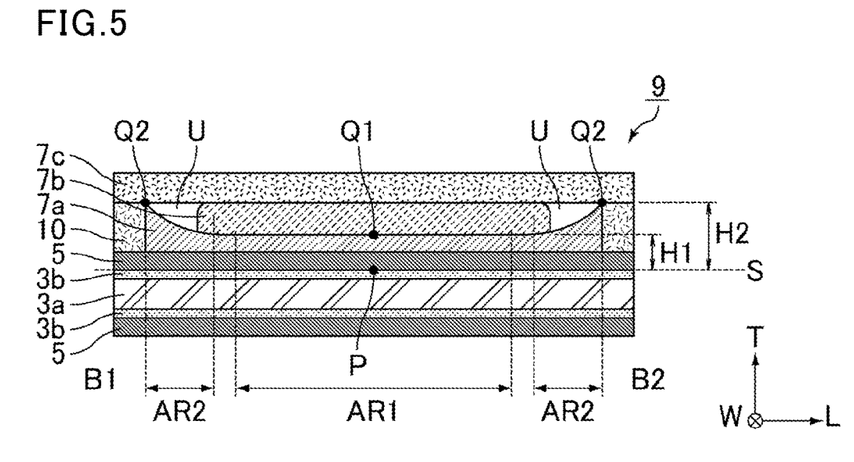
FIG. 5 is a schematic cross-sectional view of a portion taken along line B1-B2 in FIG. 3.

FIG. 5 is a schematic cross-sectional view of a portion taken along line B1-B2 in FIG. 3. For convenience of explanation, the cross section in the length direction L and the thickness direction T shown in FIG. 5 includes a highest point in the entire porous portion 3b, a highest point in the entire central region AR1, and a highest point in the entire peripheral region AR2.

As shown in FIG. 5, the peripheral region AR2 is higher than the central region AR1 when a height in the thickness direction T is defined from a reference surface S including a highest point P of the porous portion 3b in the thickness direction T and perpendicular to the thickness direction T. More specifically, highest point Q2 of the peripheral region AR2 is higher than a highest point Q1 of the central region AR1. Here, the reference surface S is defined based on a portion, which is closest to the solid electrolyte layer 7a, of the porous portion 3b in the thickness direction T.

Owing to the above-described embodiment of the solid electrolyte layer 7a, even when the cathode lead-out layer 7c is stacked with the amount of the conductive paste applied to form the conductive layer 7b being large or even when the cathode lead-out layer 7c is stacked at a high pressing pressure, the conductive layer 7b that has been spread out between the solid electrolyte layer 7a and the cathode lead-out layer 7c is held back by the peripheral region AR2 so that the conductive layer 7b will not stick out. Thus, the conductive layer 7b can be widely spread out by the pressing pressure during stacking of the cathode lead-out layer 7c, which as a result can increase the contact area between the solid electrolyte layer 7a and the conductive layer 7b. As described above, in the solid electrolytic capacitor 1, the resistance can be reduced while the conductive layer 7b is prevented from sticking out.

The conductive layer 7b is at least on the central region AR1 of the solid electrolyte layer 7a. In view of lower resistance, preferably, the conductive layer 7b is on the entire central region AR1, and more preferably, the conductive layer 7b extends from the central region AR1 to the peripheral region AR2.

At the same time, a space U without the conductive layer 7b may be present between the solid electrolyte layer 7a and the cathode lead-out layer 7c. More specifically, the space U may be present which is surrounded by the solid electrolyte layer 7a, the conductive layer 7b, and the cathode lead-out layer 7c. Preferably, the space U is present which is surrounded by the peripheral region AR2 of the solid electrolyte layer 7a, the conductive layer 7b, and the cathode lead-out layer 7c. Thus, the space U functions as an expansion buffer space when the solid electrolytic capacitor 1 is brought into a high temperature state, for example, during heating in a reflow furnace when the solid electrolytic capacitor 1 is mounted on a wiring board via soldering. Specifically, when the solid electrolytic capacitor 1 is in a high temperature state, the space U can buffer the load that may cause destruction of the capacitor elements 20 due to interference among members having different linear expansion coefficient (here, members such as the solid electrolyte layer 7a, the conductive layer 7b, and the cathode lead-out layer 7c).

Preferably, a height H2 of the highest point Q2 of the peripheral region AR2 is greater than a height H1 of the highest point Q1 of the central region AR1 by at least 2 μm. In this case, even when the cathode lead-out layer 7c is stacked with the amount of the conductive paste applied to form the conductive layer 7b being larger or even when the cathode lead-out layer 7c is stacked at a higher pressing pressure, the conductive layer 7b will not stick out. Thus, the contact area between the solid electrolyte layer 7a and the conductive layer 7b can be further increased, which as a result can further reduce the resistance of the solid electrolytic capacitor 1.

FIG. 5 shows a view including the highest point P of the porous portion 3b, the highest point Q1 of the central region AR1, and the highest points Q2 of the peripheral region AR2. However, these highest points may not be co-present in a cross section in the length direction L and the thickness direction T or may not be co-present in a cross section in the width direction W and the thickness direction T.

The highest point P of the porous portion 3b may be at any position when viewed in the thickness direction T. For example, when viewed in the thickness direction T, the highest point P of the porous portion 3b may be at the center of the porous portion 3b or may be at a position apart from the center of the porous portion 3b toward the outer edge. In other words, the porous portion 3b may be highest at the center or at a position apart from the center toward the outer edge.

The highest point Q1 of the central region AR1 may be at any position when viewed in the thickness direction T. For example, when viewed in the thickness direction T, the highest point Q1 of the central region AR1 may be at the center of the central region AR1, i.e., the center of the solid electrolyte layer 7a, or may be at a position apart from the center of the central region AR1 toward the peripheral region AR2. In other words, the central region AR1 may be highest at the center or at a position apart from the center toward the peripheral region AR2.

The highest point of the central region AR1 when viewed in the cross section shown in FIG. 5 has been regarded as the highest point Q1 in the entire central region AR1, but it may not be the highest point Q1. In other words, a highest point of the central region AR1 when viewed in a different cross section in the thickness direction T may be the highest point Q1.

There may be only one highest point Q1 or multiple highest points Q1 of the central region AR1 in the entire central region AR1. Depending on the cross section in the thickness direction T, the highest point Q1 of the central region AR1 may not be present, or there may be only one highest point Q1 or multiple highest points Q1 as shown in FIG. 5. In FIG. 5, the central region AR1 seemingly has a constant height, indicating the presence of multiple highest points Q1 of the central region AR1.

When viewed in a cross section in the thickness direction T, the height of the highest point of the central region AR1 may or may not vary depending on the cross section in the thickness direction T.

The highest point Q2 of the peripheral region AR2 may be at any position when viewed in the thickness direction T. For example, when viewed in the thickness direction T, the highest point Q2 of the peripheral region AR2 may be at an end of the peripheral region AR2 away from the central region AR1, i.e., on an outer edge of the solid electrolyte layer 7a; or may be at a position apart from the end of the peripheral region AR2 away from the central region AR1 toward the central region AR1. In other words, the peripheral region AR2 may be highest at its end away from the central region AR1 or at a position apart from its end away from the central region AR1 toward the central region AR1.

The highest point of the peripheral region AR2 when viewed in the cross section shown in FIG. 5 has been regarded as the highest point Q2 in the entire peripheral region AR2, but it may not be the highest point Q2. Specifically, a highest point of the peripheral region AR2 when viewed in a different cross section in the thickness direction T may be the highest point Q2.

There may be only one highest point Q2 or multiple highest points Q2 of the peripheral region AR2 in the entire peripheral region AR2. Depending on the cross section in the thickness direction T, the highest point Q2 of the peripheral region AR2 may not be present, or there may be only one highest point Q2 or multiple highest points Q2 as shown in FIG. 5. In FIG. 5, the peripheral region AR2 is seemingly the highest at both ends away from the central region AR1, indicating the presence of two highest points Q2 of the peripheral region AR2.

When viewed in a cross section in the thickness direction T, the height of the highest point of the peripheral region AR2 may or may not vary depending on the cross section in the thickness direction T.

While FIG. 5 shows a cross section in the length direction L and the thickness direction T, the peripheral region AR2 is similarly higher than the central region AR1 when viewed in another cross section in the thickness direction T, for example, a cross section in the width direction W and the thickness direction T. Thus, when viewed in a cross section in the thickness direction T, the peripheral region AR2 is higher than the central region AR1, so that the peripheral region AR2 is higher than the central region AR1, along the periphery of the central region AR1.

A contour image taken by a confocal microscope, for example, shows that the peripheral region AR2 is higher than the central region AR1, along the periphery of the central region AR1. A cross section in the thickness direction T as shown in FIG. 5 is observed as a cross-sectional image taken by scanning electron microscope (SEM), for example. A combination of analysis of a contour image and a cross-sectional image as described above can identify the position of the highest point P of the porous portion 3b (i.e., the position of the reference surface S), the position of the highest point Q1 of the central region AR1, and the highest point Q2 of the peripheral region AR2.

The solid electrolytic capacitor of Embodiment 1 of the present invention, i.e., the solid electrolytic capacitor 1 shown in FIG. 1, FIG. 2, and elsewhere, can be produced by the following method, for example.

Forming Resin Molding

First, the valve-action metal substrate 3a including the porous portion 3b at the surface thereof, i.e., the anode 3, is provided. Then, the surface of the porous portion 3b is anodized to form the dielectric layer 5 on the porous portion 3b.

Next, the solid electrolyte layer 7a is formed on the surface of the dielectric layer 5 preferably by screen printing. Here, the solid electrolyte layer 7a is formed on the surface of the dielectric layer 5 such that the peripheral region AR2 is higher than the central region AR1, along the periphery of the central region AR1.

The solid electrolyte layer 7a of the above-described embodiment can be formed by, for example, applying coating to a region corresponding to the peripheral region AR2 more times than to a region corresponding to the central region AR1 during screen printing on the surface of the dielectric layer 5; adjusting the specifications of a screen printing plate; or adjusting coating conditions for screen printing.

In the case of applying coating to the region corresponding to the peripheral region AR2 more times than to the region corresponding to the central region AR1 during screen printing on the surface of the dielectric layer 5, for example, the region corresponding to the central region AR1 may be coated one time, and the region corresponding to the peripheral region AR2 may be coated two times. However, in view of production efficiency and cost, preferably, the region corresponding to the central region AR1 and the region corresponding to the peripheral region AR2 are simultaneously coated one time. In this case, preferably, the solid electrolyte layer 7a is formed by adjusting the specifications of a screen printing plate or adjusting coating conditions for screen printing as described below.

In the case of adjusting the specifications of a screen printing plate, for example, it is effective to make the wire diameter of the screen printing plate smaller in the region corresponding to the peripheral region AR2 than in the region corresponding to the central region AR1; or to make the opening of the screen printing plate larger in the region corresponding to the peripheral region AR2 than in the region corresponding to the central region AR1.

In the case of adjusting coating conditions for screen printing, for example, it is effective to make the printing pressure for screen printing higher in the region corresponding to the peripheral region AR2 than in the region corresponding to the central region AR1; or to make the printing speed for screen printing lower in the region corresponding to the peripheral region AR2 than in the region corresponding to the central region AR1.

Next, the conductive layer 7b is formed on the surface of the solid electrolyte layer 7a by screen printing or the like.

Further, the cathode lead-out layer 7c is formed on the surface of the conductive layer 7b by a method such as metal foil laminating or screen printing. In forming the cathode lead-out layer 7c, preferably, the cathode lead-out layer 7c is bonded to the dielectric layer 5 via the insulating adhesive layer 10.

Thus, the cathode 7 including the solid electrolyte layer 7a, the conductive layer 7b, and the cathode lead-out layer 7c is formed.

As described above, the capacitor element 20 including the anode 3, the dielectric layer 5 on the surface of the anode 3, and the cathode 7 opposite to the anode 3 via the dielectric layer 5 is produced.

Next, multiple capacitor elements 20 are stacked to produce the stack 30. Then, a compression mold or the like is used to seal the stack 30 by the sealing resin 8 to form the resin molding 9.

The resin molding 9 is substantially cuboidal and includes the first end surface 9a and the second end surface 9b opposite to each other in the length direction L; the first main surface 9c and the second main surface 9d opposite to each other in the thickness direction T; and the first side surface 9e and the second side surface 9f opposite to each other in the width direction W.

In the resin molding 9, the anode 3 is exposed at the first end surface 9a, and the cathode 7 (here, the cathode lead-out layer 7c) is exposed at the second end surface 9b.

Forming First External Electrode

The first external electrode 11 connected to the anode 3 exposed at the first end surface 9a is formed on the first end surface 9a of the resin molding 9. Here, the first external electrode 11 may be formed to extend from the first end surface 9a of the resin molding 9 to a portion of at least one surface selected from the group consisting of the first main surface 9c, the second main surface 9d, the first side surface 9e, and the second side surface 9f.

Forming Second External Electrode

The second external electrode 13 connected to the cathode 7 (here, the cathode lead-out layer 7c) exposed at the second end surface 9b is formed on the second end surface 9b of the resin molding 9. Here, the second external electrode 13 may be formed to extend from the second end surface 9b of the resin molding 9 to a portion of at least one surface selected from the group consisting of the first main surface 9c, the second main surface 9d, the first side surface 9e, and the second side surface 9f.

The forming of the first external electrode and the forming of the second external electrode may be performed separately or simultaneously. When these steps are performed separately, the order is not limited.

As described above, the solid electrolytic capacitor 1 shown in FIG. 1, FIG. 2, and elsewhere is produced.

Modified Example of Embodiment 1

In the solid electrolytic capacitor of Embodiment 1 of the present invention (i.e., the solid electrolytic capacitor 1 shown in FIG. 1, FIG. 2, and elsewhere), the cathode lead-out layer 7c is bonded to the dielectric layer 5 via the insulating adhesive layer 10. However, the insulating adhesive layer 10 may not be included.

Figure 6:
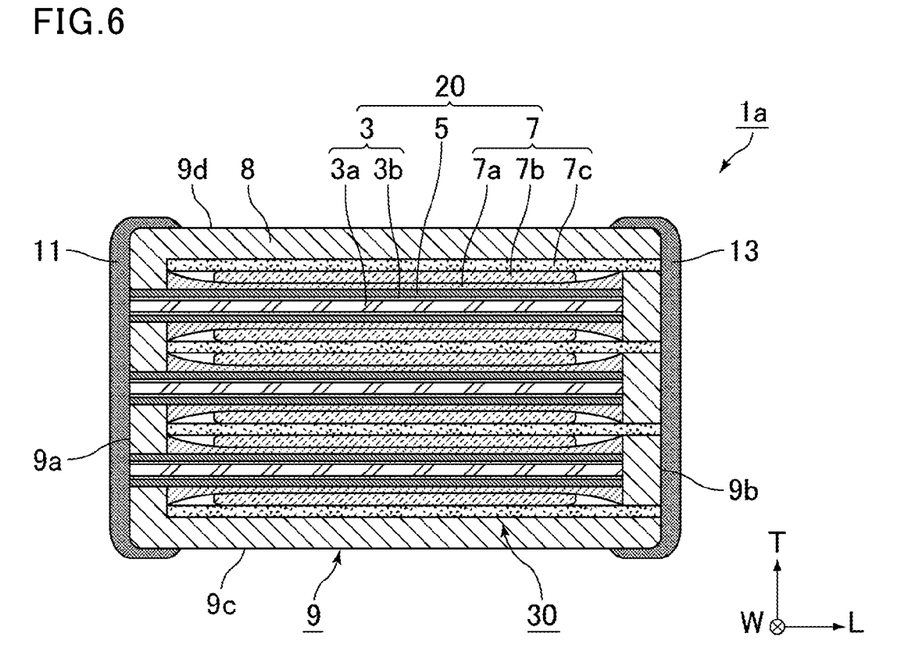
FIG. 6 is a schematic cross-sectional view of a solid electrolytic capacitor according to a modified example of Embodiment 1 of the present invention.

FIG. 6 is a schematic cross-sectional view of a solid electrolytic capacitor according to a modified example of Embodiment 1 of the present invention.

As shown in FIG. 6, a solid electrolytic capacitor 1a does not include the insulating adhesive layer 10. More specifically, the insulating adhesive layer 10 is not disposed between the dielectric layer 5 and the cathode lead-out layer 7c.

Embodiment 2

In the solid electrolytic capacitor of the present invention, the solid electrolyte layer may include multiple protrusions at a surface thereof in the central region, and apexes of the multiple protrusions may be lower than the peripheral region. An example of such a solid electrolytic capacitor of the present invention is described as a solid electrolytic capacitor of Embodiment 2 of the present invention. The solid electrolytic capacitor of Embodiment 2 of the present invention is the same as the solid electrolytic capacitor of Embodiment 1 of the present invention, except for the embodiment of the solid electrolyte layer.

Figure 7:
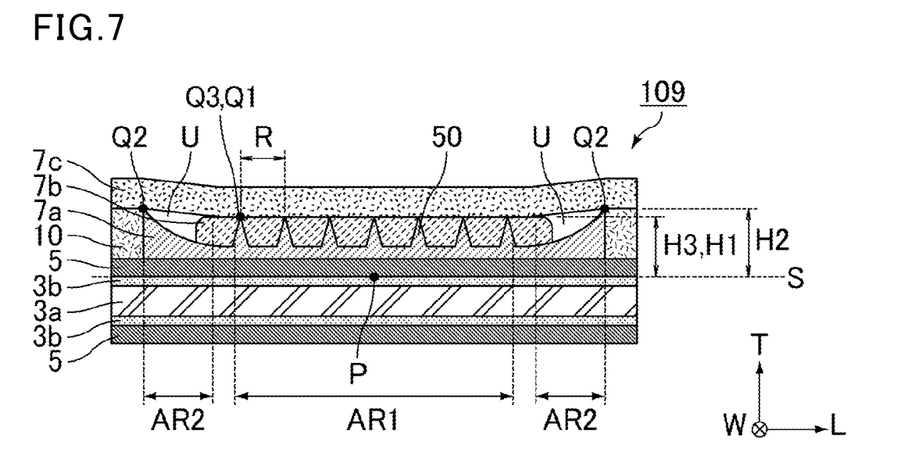
FIG. 7 is a schematic cross-sectional view of a portion of a resin molding of a solid electrolytic capacitor according to Embodiment 2 of the present invention.

FIG. 7 is a schematic cross-sectional view of a portion of a resin molding of the solid electrolytic capacitor according to Embodiment 2 of the present invention. For convenience of explanation, the cross section in the length direction L and the thickness direction T shown in FIG. 7 includes a highest point in the entire porous portion 3b, a highest point in the entire central region AR1, and a highest point in the entire peripheral region AR2, as is the case with FIG. 5.

As shown in FIG. 7, in a resin molding 109, the solid electrolyte layer 7a is partially protruding. Thus, the solid electrolyte layer 7a includes multiple protrusions 50 at the surface thereof in the central region AR1.

Apexes Q3 of the multiple protrusions 50 are lower than the peripheral region AR2. More specifically, the apexes Q3 of the multiple protrusions 50 are lower than the highest point Q2 of the peripheral region AR2.

At the same time, the peripheral region AR2 is higher than the central region AR1, along the periphery of the central region AR1, so that the peripheral region AR2 is higher than the apexes Q3 of the multiple protrusions 50, along the periphery of the central region AR1. More specifically, the highest point Q2 of the peripheral region AR2 is higher than the apexes Q3 of the multiple protrusions 50.

The apexes Q3 of the multiple protrusions 50 are the maximum points of the surface of the solid electrolyte layer 7a when viewed in a cross section in the thickness direction T. Thus, the apex at the highest level among the apexes Q3 of the multiple protrusions 50 is also the highest point Q1 of the central region AR1. For example, in FIG. 7, the apexes Q3 of the multiple protrusions 50 are seemingly at the same height. Each apex Q3 is also the highest point Q1 of the central region AR1.

In a conventional solid electrolytic capacitor, when a solid electrolytic capacitor is brought into a high temperature state, for example, during heating in a reflow furnace when a solid electrolytic capacitor is mounted on a wiring board via soldering, the solid electrolyte layer is perforated, whereby underlayers such as a dielectric layer and a porous portion may be exposed from the solid electrolyte layer. In this case, an external pressure applied to a cathode lead-out layer or internal expansion of the solid electrolytic capacitor causes an anode and the cathode lead-out layer to approach each other, which may cause a short circuit between the anode and the cathode lead-out layer. In contrast, in the solid electrolytic capacitor of the present invention, the peripheral region AR2 of the solid electrolyte layer 7a is higher than the central region AR1, along the periphery of the central region AR1, which prevents the anode 3 and the cathode lead-out layer 7c from approaching each other. In addition, in the solid electrolytic capacitor of Embodiment 2 of the present invention, the multiple protrusions 50 of the solid electrolyte layer 7a secure the space between the anode 3 and the cathode lead-out layer 7c, which further prevents the anode 3 and the cathode lead-out layer 7c from approaching each other. Thus, in the solid electrolytic capacitor of Embodiment 2 of the present invention, a short circuit between the anode 3 and the cathode lead-out layer 7c is prevented even in a high temperature state, thus increasing the reliability.

To secure the space between the anode 3 and the cathode lead-out layer 7c, a distance R between adjacent apexes Q3 of the multiple protrusions 50 is preferably 170 µm or less. The distance R between adjacent apexes Q3 of the multiple protrusions 50 is preferably 50 µm or more. In this case, not only when viewed in a cross section in the length direction L and the thickness direction T shown in FIG. 7 but also when viewed in another cross section in the thickness direction T, for example, when viewed in a cross section in the width direction W and the thickness direction T, the distance R between adjacent apexes Q3 of the multiple protrusions 50 is preferably 50 µm to 170 µm.

The distance R between adjacent apexes Q3 of the multiple protrusions 50 is defined as follows.

When there are five or more apexes Q3 when viewed in a cross section in the thickness direction T, five apexes Q3 are selected from these apexes Q3 in descending order of the height, and an average of distances of adjacent apexes Q3 is calculated for these five apexes Q3. When there are less than five apexes Q3 when viewed in a cross section in the thickness direction T, an average of distances of adjacent apexes Q3 is calculated for all the apexes Q3. Then, the average thus obtained is defined as the distance R between adjacent apexes Q3 of the multiple protrusions 50.

To secure the space between the anode 3 and the cathode lead-out layer 7c, a height H3 of the apex Q3 of each protrusion 50 is preferably 2 µm or more. To secure the space between the anode 3 and the cathode lead-out layer 7c, the height H3 of the apex Q3 of each protrusion 50 is preferably 3 µm or less. In this case, not only when viewed in a cross section in the length direction L and the thickness direction T shown in FIG. 7 but also when viewed in another cross section in the thickness direction T, for example, when viewed in a cross section in the width direction W and the thickness direction T, the height H3 of the apex Q3 of each protrusion 50 is preferably 2 µm to 3 µm.

The height H3 of the apex Q3 of each protrusion 50 is defined as follows.

When there are five or more apexes Q3 when viewed in a cross section in the thickness direction T, five apexes Q3 are selected from these apexes Q3 in descending order of the height, and an average of heights of the apexes Q3 is calculated for these five apexes Q3. When there are less than five apexes Q3 when viewed in a cross section in the thickness direction T, an average of heights of the apexes Q3 is calculated for all the apexes Q3. Then, the average thus obtained is defined as the height H3 of the apex Q3 of each protrusion 50.

In the case where the distance R between adjacent apexes Q3 of the multiple protrusions 50 is more than 170 µm, when the height H3 of the apex Q3 of each protrusion 50 is lower than 2 µm, the distance between the anode 3 and the cathode lead-out layer 7c is not sufficiently secured, possibly causing a short circuit between the anode 3 and the cathode lead-out layer 7c in a high temperature state. To prevent such a short circuit between the anode 3 and the cathode lead-out layer 7c, preferably, the height H3 of the apex Q3 of each protrusion 50 is preferably 3 µm or more when the distance R between adjacent apexes Q3 of the multiple protrusions 50 is more than 170 µm.

When the distance R between adjacent apexes Q3 of the multiple protrusions 50 is less than 70 µm, the height H3 of the apex Q3 of each protrusion 50 may be 2 µm or less.

When viewed in a cross section in the thickness direction T, among the multiple protrusions 50, the distance between adjacent apexes Q3 may be the same as one another as shown in FIG. 7 or may be different from one another.

The height of the apex Q3 of each protrusion 50 when viewed in a cross section in the thickness direction T may be the same as one another as shown in FIG. 7 or may be different from one another. In FIG. 7, the apexes Q3 of the multiple protrusions 50 are seemingly at the same height, and each apex Q3 is also the highest point Q1 of the central region AR1, so that the height H3 of the apex Q3 of each protrusion 50 is the same as the height H1 of the highest point Q1 of the central region AR1.

The multiple protrusions 50 each may have any shape such as a conical or pyramidal shape. Thus, the multiple protrusions 50 when viewed in a cross section in the thickness direction T each may have a tapered shape in which the length of the protrusion 50 in the direction perpendicular to the thickness direction T decreases from the dielectric layer 5 side to the cathode lead-out layer 7c side or may not have a tapered shape.

The multiple protrusions 50 may have sharp, round, or flat ends.

The multiple protrusions 50 may have the same shape or different shapes.

In the solid electrolyte layer 7a, the multiple protrusions 50 may be present not only in the central region AR1 but also in a region different from the central region AR1. For example, the multiple protrusions 50 may be present not only in the central region AR1 but also in a region between the central region AR1 and the peripheral region AR2, in the peripheral region AR2, in the region between the central region AR1 and the peripheral region AR2, and in the peripheral region AR2.

A method of producing the solid electrolytic capacitor of Embodiment 2 of the present invention is the same as the method of producing the solid electrolytic capacitor of Embodiment 1 of the present invention, except that the solid electrolyte layer 7a is formed to include the multiple protrusions 50 at the surface thereof in the central region AR1 during formation of the resin molding 109 in the forming of the resin molding.

As described above, the solid electrolyte layer 7a is formed on the surface of the dielectric layer 5 preferably by screen printing. Here, the solid electrolyte layer 7a is formed such that mesh marks from the mesh shape of the screen printing plate appear at the surface of the central region AR1 of the solid electrolyte layer 7a. Thus, the multiple protrusions 50 can be formed at the surface of the central region AR1 of the solid electrolyte layer 7a.

When forming the solid electrolyte layer 7a by screen printing, various parameters of the multiple protrusions 50, such as the distance R between adjacent apexes Q3 of the multiple protrusions 50 and the height H3 of the apex Q3 of each protrusion 50, can be controlled by adjusting the wire diameter, opening, and the like of the screen printing plate.

REFERENCE SIGNS LIST 1, 1a solid electrolytic capacitor
3 anode
3a valve-action metal substrate
3b porous portion
5 dielectric layer
7 cathode
7a solid electrolyte layer
7b conductive layer
7c cathode lead-out layer
8 sealing resin
9, 109 resin molding
9a first end surface
9b second end surface
9c first main surface
9d second main surface
9e first side surface
9f second side surface
10 insulating adhesive layer
11 first external electrode
13 second external electrode
20 capacitor element
30 stack
50 protrusion
AR1 central region
AR2 peripheral region
E1 first outer edge
E2 second outer edge
E3 third outer edge
E4 fourth outer edge
H1 height of highest point of central region
H2 height of highest point of peripheral region
H3 height of apex of protrusion
L length direction
M1 length in length direction of central region
M2 length in width direction of central region
M3 length in length direction of peripheral region
M4 length in width direction of peripheral region
N1 distance in length direction between first outer edge and second outer edge
N2 distance in width direction between third outer edge and fourth outer edge
P highest point of porous portion
Q1 highest point of central region
Q2 highest point of peripheral region
Q3 apex of protrusion
R distance between adjacent apexes of protrusions
S reference surface
T thickness direction
U space
W width direction

The invention claimed is:

1. A solid electrolytic capacitor comprising:
a valve-action metal substrate including a porous portion at a surface thereof;
a dielectric layer on the porous portion;
a solid electrolyte layer on the dielectric layer;
a conductive layer on the solid electrolyte layer; and
a cathode lead-out layer on the conductive layer,
wherein when viewed in a thickness direction corresponding to a stacking direction of the valve-action metal substrate, the dielectric layer, the solid electrolyte layer, the conductive layer, and the cathode lead-out layer, the solid electrolyte layer includes a central region at a center of the solid electrolyte layer and a peripheral region surrounding the central region and defining outer edges of the solid electrolyte layer,
the peripheral region is higher than the central region in the thickness direction as measured from a reference surface including a highest point of the porous portion in the thickness direction and perpendicular to the thickness direction, the conductive layer is at least on the central region of the solid electrolyte layer, and the conductive layer is entirely within the outer edges of the solid electrolyte layer.

2. The solid electrolytic capacitor according to claim 1, wherein a height of a highest point of the peripheral region is greater than a height of a highest point of the central region by at least 2 μm.

3. The solid electrolytic capacitor according to claim 2, wherein the solid electrolyte layer includes multiple protrusions at a surface thereof in the central region, and a height of an apex of each protrusion is lower than the height of the highest point of the peripheral region.

4. The solid electrolytic capacitor according to claim 3, wherein a distance between adjacent apexes of the multiple protrusions is 170 μm or less.

5. The solid electrolytic capacitor according to claim 4, wherein the distance between the adjacent apexes of the multiple protrusions is 50 μm to 170 μm.

6. The solid electrolytic capacitor according to claim 4, wherein the height of the apex of each protrusion is 2 μm or more.

7. The solid electrolytic capacitor according to claim 6, wherein the height of the apex of each protrusion is 2 μm to 3 μm.

8. The solid electrolytic capacitor according to claim 3, wherein the height of the apex of each protrusion is 3 μm or more and a distance between adjacent apexes of the multiple protrusions is more than 170 μm.

9. The solid electrolytic capacitor according to claim 3, wherein the height of the apex of each protrusion is 2 μm or less and a distance between adjacent apexes of the multiple protrusions is less than 70 μm.

10. The solid electrolytic capacitor according to claim 1, wherein the solid electrolyte layer includes multiple protrusions at a surface thereof in the central region, and a height of an apex of each protrusion is lower than a height of a highest point of the peripheral region.

11. The solid electrolytic capacitor according to claim 10, wherein a distance between adjacent apexes of the multiple protrusions is 170 μm or less.

12. The solid electrolytic capacitor according to claim 11, wherein the distance between the adjacent apexes of the multiple protrusions is 50 μm to 170 μm.

13. The solid electrolytic capacitor according to claim 11, wherein the height of the apex of each protrusion is 2 μm or more.

14. The solid electrolytic capacitor according to claim 13, wherein the height of the apex of each protrusion is 2 μm to 3 μm.

15. The solid electrolytic capacitor according to claim 10, wherein the height of the apex of each protrusion is 3 μm or more and a distance between adjacent apexes of the multiple protrusions is more than 170 μm.

16. The solid electrolytic capacitor according to claim 10, wherein the height of the apex of each protrusion is 2 μm or less and a distance between adjacent apexes of the multiple protrusions is less than 70 μm.

17. The solid electrolytic capacitor according to claim 1, wherein a length in a length direction of the central region is 60% of a distance in the length direction between a first outer edge and a second outer edge of the outer edges of the solid electrolyte layer.

18. The solid electrolytic capacitor according to claim 17, wherein a length in a width direction of the central region perpendicular to the length direction is 60% of a distance in the width direction between a third outer edge and a fourth outer edge of the outer edges of the solid electrolyte layer.

19. The solid electrolytic capacitor according to claim 1, wherein the solid electrolyte layer is in the form of a basin.

* * * * *